United States Patent Office 2,920,483
Patented Jan. 12, 1960

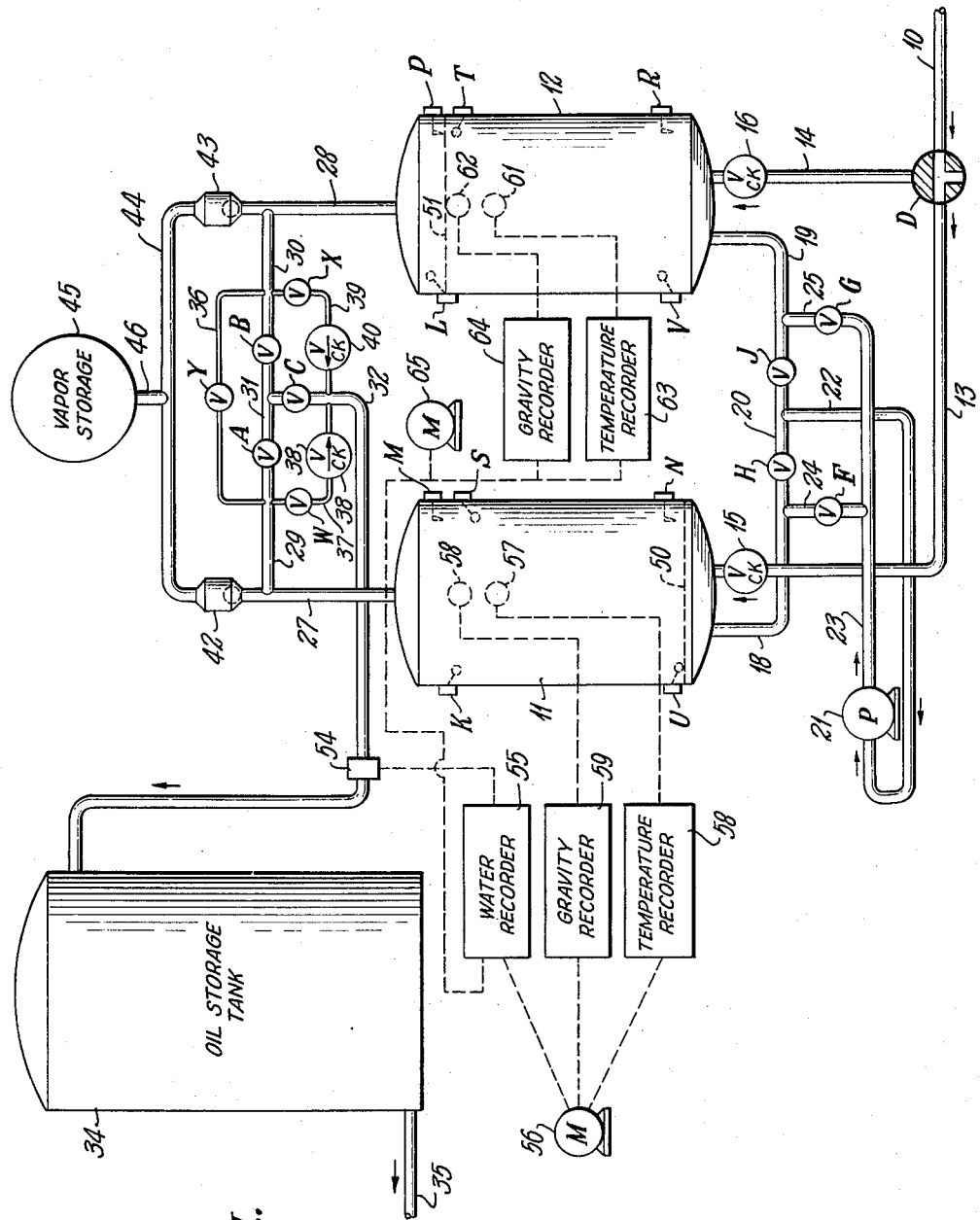
Fig. A.

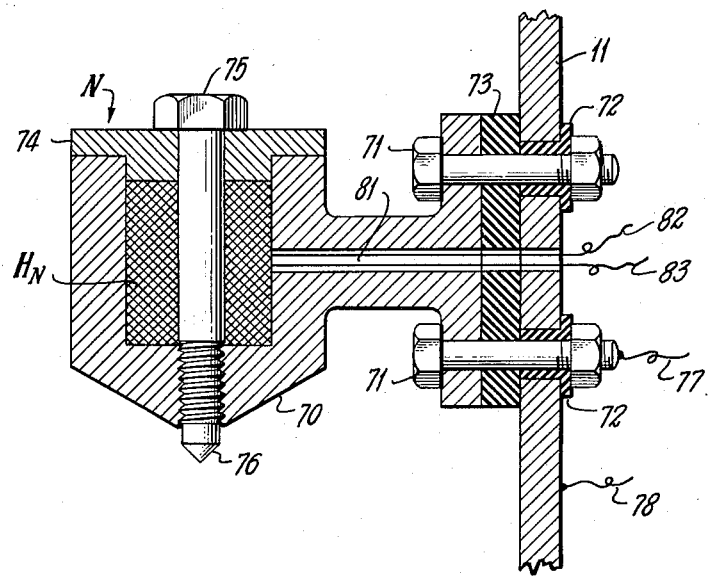
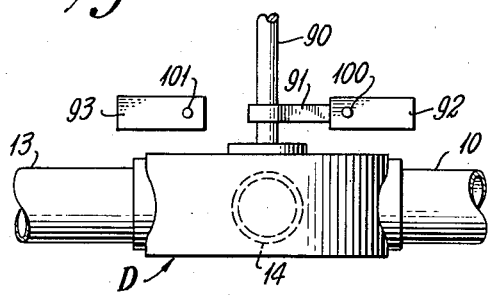
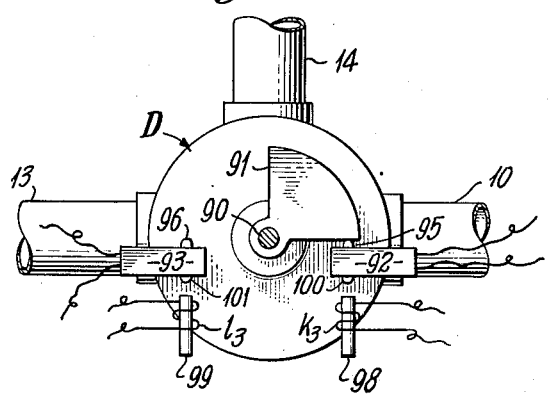
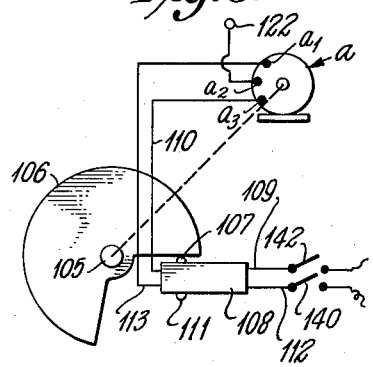

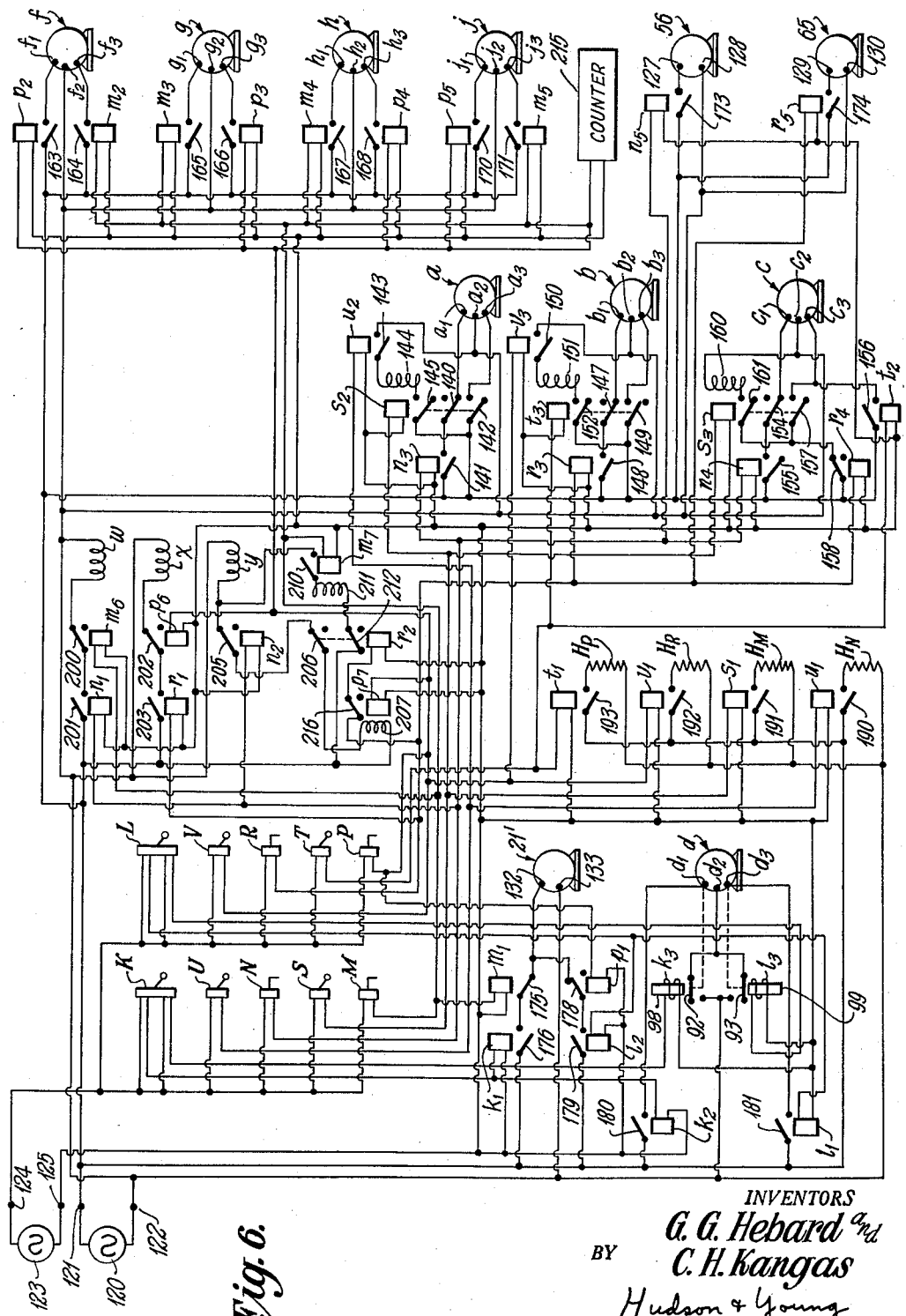

2,920,483

POSITIVE DISPLACEMENT METER

Glen G. Hebard and Charles H. Kangas, Bartlesville, Okla., assignors to Phillips Petroleum Company, a corporation of Delaware Application August 12, 1954, Serial No. 449,461

13 Claims. (Cl. 73—221)

This invention relates to a displacement meter for measuring liquids. In one specific aspect it relates to a meter for measuring oil by water displacement alternately in a pair of tanks.

As is well known by those familiar with oil producing operations, the metering of crude oil has been a problem of long standing because satisfactory oil meters are not available. At the present time the usual practice is to pump oil from individual leases into respective batteries of storage tanks to be metered prior to its delivery to a pipeline. This requires that the oil levels in the individual tanks be measured both before the introduction of oil and prior to its removal. Since oil is sold in terms of its specific gravity and water content, the operator must sample the individual tanks as well as measure the oil levels. These combined operations are time consuming and add to the cost of producing oil.

In accordance with the present invention there is provided a positive displacement meter to measure oil in an automatic manner. A pair of tanks each having a plurality of level indicators therein is provided to measure the volume of the oil supplied from producing wells. The two tanks are interconnected by a conduit system containing a pump. The tanks initially are filled with a quantity of water of sufficient volume to substantially fill one of the tanks. The oil to be measured is delivered alternately into the two tanks and displaced therefrom by transferring the water back and forth between the two tanks. Thus one tank is filled while the other is discharged. Outlet valves are opened to allow the removal of oil during the time the water level is rising a predetermined height in each tank. In this manner the actual volume of displaced oil is measured. Means also are provided to record automatically the specific gravity, the temperature and the water content of the measured oil.

Accordingly, it is an object of this invention to provide an improved displacement meter for measuring liquids.

Another object is to provide a meter for measuring oil by water displacement in a plurality of fluid containers.

A further object is to provide apparatus to measure in an automatic manner the volume, specific gravity, temperature and water content of crude oil.

Other objects, advantages and features of this invention should become apparent from the following detailed description taken in conjunction with the accompanying drawing in which:

Figure 1 is a schematic representation of the metering apparatus of this invention;

Figure 2 is a detailed view of the water level indicating switch employed in the apparatus of Figure 1;

Figure 3 is a schematic representation of a motor operated valve employed in the apparatus of Figure 1;

Figure 4 is a schematic view of a first motor valve limit switch employed in the apparatus of Figure 1;

Figure 5 is a schematic view of a second motor valve limit switch employed in the apparatus of Figure 1; and Figure 6 is a schematic circuit diagram of the electrical components of the apparatus of Figure 1.

Referring now to the drawing in detail and to Figure 1 in particular, there is shown a conduit 10 which supplies the oil to be metered. Conduit 10 is connected to the inlet port of a three-way motor valve D which has its outlet ports connected to metering tanks 11 and 12 through respective conduits 13 and 14. Conduits 13 and 14 have respective check valves 15 and 16 therein which allow the passage of oil into the tanks from valve D but not in the reverse direction. A conduit 18 is connected at one end to a port in the bottom of tank 11, and a conduit 19 is connected at one end to a port in the bottom of tank 12. The second ends of conduits 18 and 19 are connected to one another through respective motor valves H and J and a connecting conduit 20. Conduit 20 is connected to the inlet of a fluid pump 21 by a conduit 22. The outlet of pump 21 is connected to a conduit 23 which is connected to conduit 18 by a conduit 24 having a motor valve F therein. Conduit 23 is also connected to conduit 19 by a conduit 25 having a motor valve G therein.

A conduit 27 is connected to an outlet port in the top of tank 11, and a conduit 28 is connected to an outlet port in the top of tank 12. A conduit 29 extends between conduit 27 and one port of a motor valve A. A conduit 30 extends between conduit 28 and one port of a motor valve B. The second ports of motor valves A and B are connected to one another by a conduit 31. A conduit 32 having a motor valve C therein communicates between conduit 31 and the inlet of a storage tank 34. A conduit 35 communicates with the outlet of storage tank 34. A branch conduit 36 having a solenoid operated valve Y therein communicates between conduits 29 and 30. A branch conduit 37 having a solenoid operated valve W and a check valve 38 therein communicates between conduits 29 and 32. Check valve 38 permits the flow of liquid between conduits 29 and 32 but not in the reverse direction. A branch conduit 39 having a solenoid operated valve X and a check valve 40 therein communicates between conduits 30 and 32. Check valve 40 permits the flow of liquid between conduits 30 and 32 but not in the reverse direction.

Conduit 27 communicates at its upper end with a liquid level check valve 42, and conduit 28 communicates at its upper end with a liquid level check valve 43. The second ends of check valves 42 and 43 communicate with one another through a conduit 44 which is also connected to a vapor storage tank 45 by a connecting conduit 46. Check valves 42 and 43 are closed by rising liquid levels in respective conduits 27 and 28. These check valves are in communication with one another, however, to provide pressure equalization of the oil vapors.

Tanks 11 and 12 contain a quantity of water which is of sufficient volume to substantially fill one of the tanks. For purposes of description it will be assumed that the water level in tank 11 initially is at line 50 and that the water level in tank 12 initially is at line 51. The regions above lines 50 and 51 are at least partially filled with oil which has been supplied by conduit 10. Interface float switches U and V are disposed near the bottoms of respective tanks 11 and 12. These switches are adapted to be raised by the rising water levels to complete electrical circuits therethrough. However, switches U and V are not raised by rising oil levels. Water level detecting switches N and R are mounted in respective tanks 11 and 12 above respective switches U and V. Electrical circuits are completed through these switches whenever the lower tips thereof are submerged in water. Interface float switches S and T are mounted in respective tanks 11 and 12 at regions spaced above respective switches N and R. These switches are also closed by rising water levels but not by rising oil levels. Float switches K and L are mounted in respective tanks 11 and 12 at positions above respective switches S and T. Switches K and L each are provided with two sets of electrical contacts. One set is closed when the switches are in down positions and the second set is closed when the switches are in up positions. These switches are actuated by rising oil levels. Water level indicating switches M and P are mounted in respective tanks 11 and 12 at positions spaced above respective switches K and L. Electrical circuits are also completed through these switches whenever the lower tips thereof are submerged in water.

A water indicating unit 54 is attached to conduit 32 to measure the water content in the oil supplied to storage tank 32. This unit can comprise any known apparatus which is capable of detecting the presence of water in oil. An example of such apparatus comprises a capacitance element to measure the dielectric properties of the liquid. The output signal from unit 54 is applied to a recorder 55 which is driven by a motor 56. A first temperature indicating probe 57 is disposed in tank 11 to measure the temperature of the oil. The signal from probe 57 is applied to a recorder 58 which is also driven by motor 56. A gravity measuring instrument 58 is also disposed in tank 11 to measure the specific gravity of the oil. Instrument 58 is connected to a recorder 59 which is also driven by motor 56. A temperature indicating probe 61 and a gravity measuring instrument 62 are disposed in tank 12. These latter two elements are connected to respective recorders 63 and 64 which are driven by a motor 65. Motor 65 is also connected to recorder 55.

Float switches U, V, S, T, K and L can be commercially available switches of the type which trip a mercury filled tube when the float elements are elevated. These switches are well known in the art and for this reason are not described in detail.

Water level indicating switches N, R, M and P can be of the type illustrated in Figure 2. Switch N is shown attached to the side of metal tank 11. The switch comprises a metal housing 70 which is secured to the wall of tank 11 by bolts 71 which extend through the insulating bushing 72. An insulating disc 73 is disposed between housing 70 and tank 11. A cover plate 74 is attached to housing 70 and a screw 75 is threaded through housing 70. The tip 76 of screw 75 extends downwardly from housing 70 to engage the rising water level. A first electrical lead 77 is attached to one of the bolts 71 so as to be connected electrically through housing 70 to tip 76 of screw 75. A second electrical lead 78 is attached to metal tank 11. In this manner an electrical circuit is completed between leads 77 and 78 whenever the water level in tank 11 rises to tip 76. The water completes an electrical circuit whereas the oil floating above the water is non-conductive. A heating coil $H_N$ is positioned in housing 70 for the purpose of heating tip 76 to prevent the deposit of heavy hydrocarbon constituents thereon. A passage 81 is formed through housing 70 and the wall of tank 11 to permit the passage of electrical leads 82 and 83 to heating coil $H_N$.

The various valves illustrated in Figure 1 are provided with limit switches to stop rotation of the motors associated with these valves when the valves reach either fully open or fully closed positions. The limit switch arrangement associated with three-way valve D is illustrated in Figures 3 and 4. Valve D can be a plug valve which has its valve stem 90 connected through suitable gearing, not shown, to the motor, also not shown, which operates the valve. A plate 91 is mounted on stem 90 to engage a first limit switch 92 when the valve is in one position and to engage a second limit switch 93 when the valve is in a second position. Limit switches 92 and 93 can be commercially available snap acting switches which are opened when plate 91 strikes respective buttons 95 and 96, see Figure 4. Switches 92 and 93 are provided with reset mechanism which can be in the form of plungers 98 and 99 which engage respective buttons 100 and 101 of switches 92 and 93 when energized by respective solenoids $k_3$ and $l_3$.

In Figure 5 there is shown a limit switch arrangement which is provided on motor valves A, B, C, F, G, H and J. The valve stem 105 of valve A, which is rotated by motor a, supports a plate 106 which engages a button 107 on a switch 108 to break a circuit between leads 109 and 110 when the valve is closed. When plate 106 is rotated counterclockwise approximately 90° to open the valve, button 111 of switch 108 is engaged to break connection between leads 112 and 113.

In Figure 6 there is illustrated a schematic circuit diagram of the electrical connections between the switches in tanks 11 and 12 and the electrically operated equipment external of these tanks. The various motors, which operate the valves and recorders, and the heating coils associated with switches N, R, M and P are energized from a first voltage source 120 having output terminals 121 and 122. The various switches in tanks 11 and 12 control relays which energize the motors and heating coils. The control circuits are energized by a source of voltage 123 having output terminals 124 and 125. Source 123 conveniently is of lower voltage than source 120.

The motors which actuate the various valves are indicated by small reference letters corresponding to the capital letters which indicate the valves in Figure 1.

Motors $a$, $b$, $c$, $d$, $f$, $g$, $h$ and $j$ are each provided with three terminals indicated by respective subscripts 1, 2 and 3. Considering motor $a$, for example, these terminals are designated by reference characters $a_1$, $a_2$ and $a_3$. When terminals $a_1$ and $a_2$ are energized, motor $a$ is rotated in a forward direction to open valve A. When terminals $a_2$ and $a_3$ are energized, motor $a$ is rotated in a reverse direction to close valve A. Each of the other valves operate in the same manner. For purposes of description it will be assumed that valve D communicates with tank 12 in the "open" position and with tank 11 in the "closed" position. Motor 56 is provided with a pair of terminals 127 and 128, and motor 65 is provided with a pair of terminals 129 and 130. A motor 21' having terminals 132 and 133 is provided to actuate pump 21. Motor terminals $a_2$, $b_2$, $c_2$, $f_2$, $g_2$, $h_2$, $j_2$, 128, 130 and 133 are connected directly to power terminal 122.

Motor terminal $a_1$ is connected to power terminal 121 through series connecting switches 140, 141. Switches 140 and 141 are actuated by respective relays $s_2$ and $n_3$. In the absence of current being supplied to relay $s_2$, switch 140 is closed. In the absence of current being supplied to relay $n_3$, switch 141 is open. Motor terminal $a_3$ is connected to power terminal 121 through a switch 142 which also is actuated by relay $s_2$. In the absence of current being supplied to relay $s_2$, switch 142 is open. Motor terminal $a_2$ is connected to power terminal 121 through a switch 143, a relay winding 144 and a switch 145 which are connected in series relation. Switches 143 and 145 are actuated by respective relays $b_2$ and $s_2$. Switches 143 and 145 are both open in the absence of current being supplied to their associated relays. Winding 144 constitutes a second winding of relay $s_2$.

Motor terminal $b_1$ is connected to power terminal 121 through series connected switches 147 and 148 which are actuated by respective relays $t_3$ and $r_3$. Switch 147 is closed and switch 148 is open in the absence of current being supplied to respective relays $t_3$ and $r_3$. Motor terminal $b_3$ is connected to power terminal 121 through a switch 149 which is actuated by relay $t_3$. Switch 149 is open in the absence of current being supplied to relay $t_3$. Motor terminal $b_2$ is also connected to power terminal 121 through a switch 150, a relay winding 151 and a switch 152 which are connected in series relation. Switches 150 and 152 are actuated by respective relays $v_3$ and $t_3$. These two switches are both open in the absence of current being supplied to their respective relays. Relay winding 151 comprises a second winding of relay $t_3$.

Motor terminal $c_1$ is connected to power terminal 121 through series connected switches 154 and 155 which are actuated by respective relays $s_3$ and $n_4$. Switch 154 is closed in the absence of current being supplied to relay $s_3$, and switch 155 is open in the absence of current being supplied to relay $n_4$. Motor terminal $c_3$ is connected to power terminal 121 through a switch 156 which is actuated by a relay $t_2$. Switch 155 is open in the absence of current being supplied to relay $t_2$. Motor terminal $c_3$ is also connected to power terminal 121 through series connected switches 157 and 158 which are actuated by respective relays $s_3$ and $r_4$. Switch 157 is open in the absence of current being supplied to relay $s_3$, and switch 158 is closed in the absence of current being supplied to relay $r_4$. Motor terminal $c_2$ is connected to power terminal 121 through a relay winding 160, a switch 161 and switch 158. Switch 161 is open in the absence of current being supplied to relay $s_3$. Winding 160 comprises a second winding of relay $s_3$.

Motor terminal $f_1$ is connected to power terminal 121 through a switch 163 which is actuated by a relay $p_2$, and motor terminal $f_3$ is connected to power terminal 121 through a switch 164 which is actuated by a relay $m_2$. Switches 163 and 164 are open in the absence of current being supplied to respective relays $p_2$ and $m_2$.

Motor terminal $g_1$ is connected to power terminal 121 through a switch 165 which is actuated by relay $m_3$, and motor terminal $g_3$ is connected to power terminal 121 through a switch 166 which is actuated by a relay $p_3$. Switches 165 and 166 are open in the absence of current being supplied to respective relays $m_3$ and $p_3$.

Motor terminal $h_1$ is connected to power terminal 121 through a switch 167 which is actuated by a relay $m_4$, and motor terminal $h_3$ is connected to power terminal 121 through a switch 168 which is actuated by a relay $p_4$. Switches 167 and 168 are open in the absence of current being supplied to respective relays $m_4$ and $p_4$.

Motor terminal $j_1$ is connected to power terminal 121 through a switch 170 which is actuated by a relay $p_5$, and motor terminal $j_3$ is connected to power terminal 121 through a switch 171 which is actuated by a relay $n_5$. Switches 170 and 171 are open in the absence of current being supplied to respective relays $m_5$ and $p_5$.

Terminal 127 of motor 56 is connected to power terminal 121 through a switch 173 which is actuated by a relay $n_5$. This switch is open in the absence of current being supplied to relay $n_5$. Terminal 129 of motor 65 is connected to power terminal 121 through a switch 174 which is actuated by a relay $r_5$. Switch 174 is open in the absence of current being supplied to relay $r_5$. Terminal 132 of motor 21' is connected to power terminal 121 through series connected switches 175 and 176 which are actuated by respective relays $m_1$ and $k_1$. Switch 175 is closed in the absence of current being supplied to relay $m_1$, and switch 176 is open in the absence of current being supplied to relay $k_1$. Terminal 132 is also connected to power terminal 121 through series connected switches 178 and 179 which are actuated by respective relays $p_1$ and $l_2$. Switch 178 is closed in the absence of current being supplied to relay $p_1$, and switch 179 is open in the absence of current being supplied to relay $l_2$.

Motor terminal $d_1$ is connected to power terminal 121 through a switch 180 which is actuated by a relay $k_2$. Switch 180 is open in the absence of current being supplied to relay $k_2$. Motor terminal $d_3$ is connected to power terminal 121 through a switch 181 which is actuated by a relay $l_1$. Switch 181 is open in the absence of current being supplied to relay $l_1$. Motor terminal $d_2$ is connected to power terminal 122 through parallel limit switches 92 and 93 which are actuated by respective solenoid actuated plungers 98 and 99, see also Figure 4. Plungers 98 and 99 are energized by respective solenoids $k_3$ and $l_3$. The operation of limit switches 92 and 93 is described in detail hereinafter.

Water level indicating switches N, M, R and P are provided with respective heating coils $H_N$, $H_M$, $H_R$ and $H_P$. Corresponding first end terminals of each of these heating coils are connected directly to power terminal 122. Corresponding second end terminals of heating coils $H_N$, $H_M$, $H_R$ and $H_P$ are connected to power terminal 121 through respective switches 190, 191, 192 and 193. Switches 190, 191, 192 and 193 are actuated by respective relays $u_1$, $s_1$, $v_1$, and $t_1$. Each of these switches is open in the absence of current being supplied to its associated relay.

Valves W, X and Y are actuated by respective solenoids $w$, $x$ and $y$ which are energized from voltage source 120. Corresponding first end terminals of these three solenoids are connected directly to power terminal 122. The second end terminal of solenoid $w$ is connected to power terminal 121 through series connected switches 200 and 201 which are actuated by respective relays $m_6$ and $n_1$. Switch 200 is closed in the absence of current being supplied to relay $m_6$, and switch 201 is open in the absence of current being supplied to relay $n_1$. The second terminal of solenoid $x$ is connected to power terminal 121 through series connected switches 202 and 203 which are actuated by respective relays $p_6$ and $r_1$. Switch 202 is closed in the absence of current being supplied to relay $p_6$, and switch 203 is open in the absence of current being supplied to relay $r_1$. The second terminal of solenoid $y$ is connected to power terminal 121 through switches 205 and 206 and a relay winding 207, all three being connected in series relation. Switches 205 and 206 are actuated by respective relays $n_2$ and $r_2$. These switches are both closed in the absence of current being supplied to their respective relays. Relay winding 207 comprises a second winding of a relay $p_7$. The second end terminal of solenoid $y$ is also connected to power terminal 121 through a switch 210, a relay winding 211 and a switch 212, all three being connected in series relation. Switches 210 and 212 are actuated by respective relays $m_7$ and $r_2$. Switch 210 is open in the absence of current being supplied to relay $m_7$, and switch 212 is closed in the absence of current being supplied to relay $r_2$. Winding 211 comprises a second winding of relay $m_7$.

The various relays thus far described are energized from voltage source 123 through associated switches in tanks 11 and 12 designated by like capital letters. Switches K and L are each provided with two sets of contacts. The first sets of contacts of these switches are closed when the switches are in "up" positions, and second sets of contacts are closed when the switches are in "down" positions. Interface switches U, S, V and T are each provided with single sets of contacts which are closed when the water levels rise above the switches. Switches N, M, R and P are each provided with single sets of contacts which are closed when the water level reaches the switches. First contacts of each of the sets of contacts in the ten switches are connected directly to power terminal 124.

The second contact of the first set of contacts in switch K is connected to power terminal 125 through parallel connected relays $k_1$ and $k_2$. These two relays are energized when switch K is in an up position. The second contact of the second set of contacts in switch K is connected to power terminal 125 through solenoid $k_3$. Solenoid $k_3$ is energized when switch K is in a down position. The second contact of the first set of contacts in switch L is connected to power terminal 125 through parallel relays $l_1$ and $l_2$. These two relays are energized when switch L is in an up position. The second contact of the second set of contacts in switch L is connected to power terminal 125 through solenoid $l_3$. Solenoid $l_3$ is energized when switch L is in a down position.

The second contact of switch U is connected to power terminal 125 through relays $u_1$ and $u_2$. The second contact of switch N is connected to power terminal 125 through relays $n_1$, $n_2$, $n_3$, $n_4$ and $n_5$. The second contact of switch S is connected to power terminal 125 through relays $s_1$, $s_2$, and $s_3$. The second contact of switch M is connected to power terminal 125 through relays $m_1$, $m_2$, $m_3$, $m_4$, $m_5$, $m_6$ and $m_7$. The second terminal of switch V is connected to power terminal 125 through relays $v_1$ and $v_3$. The second terminal of switch R is connected to power terminal 125 through relays $r_1$, $r_2$, $r_3$, $r_4$, and $r_5$. The second contact of switch T is connected to power terminal 125 through relays $t_1$, $t_2$ and $t_3$. The second contact of switch P is connected to power terminal 125 through relays $p_1$, $p_2$, $p_3$, $p_4$, $p_5$, $p_6$ and $p_7$. Closure of the contacts in the ten switches thereby energizes the relays associated with the individual switches.

The operation of the metering apparatus can be described in conjunction with Figures 1 and 2. It is assumed that valves A, B, C, D, G, H, W and X initially are closed and valves, F, J and Y are open. It is further assumed that the water level 50 in tank 11 is below switch U and that the water level 51 in tank 11 is at switch P. With this arangement, oil flows from conduit 10 through conduit 13 into tank 11. When the oil level in tank 11 rises above K the first set of contacts in switch K is closed which energizes relays $k_1$ and $k_2$. Relay $k_1$ closes switch 176 to energize motor 21'. Motor 21' drives pump 21 so that water is pumped from tank 12 to tank 11 through conduit 19, valve J, conduit 22, pump 21, conduit 23, valve F and conduit 18. At the same time, relay $k_2$ closes switch 180 to energize motor $d$ to open valve D so that the oil from conduit 10 is directed into tank 12. Limit switch 93 initially is closed to complete the circuit between motor terminal $d_2$ and power terminal 122. When motor $d$ is rotated sufficiently to open valve $d$ fully, limit switch 93 is opened. This terminates rotation of motor $d$ and leaves valve D in an open position. Limit switch 92 is open at this time.

The water level in tank 11 then rises to actuate switch U. This energizes relay $u_1$ to close switch 190 so that heating coil $H_N$ is connected across voltage source 120. Heating coil $H_N$ warms the probe in switch N so that switch N can accurately detect the rising water level.

A further rise in the water level completes a circuit through switch N. Switch N energizes relay $n_2$ to open switch 205. This deenergizes solenoid $y$ so that valve Y is closed. Switch N also energizes relay $n_3$ which closes switch 141 so that motor $a$ is rotated in a forward direction to open valve A. When valve A is open fully the limit switch, not shown in Figure 6, associated with motor $a$ breaks the contact between motor terminals $a_1$ and $a_2$ to terminate rotation of motor $a$. This limit switch is of the form shown in Figure 5. Switch 108 is connected such that the circuit between switch 140 and terminal $a_1$ is coupled between leads 109 and 110. Plate 106 breaks this connection when valve A is opened. Switch N energizes relay $n_4$ to close switch 155. This rotates motor $c$ in the forward direction to open valve C. The limit switch associated with motor $c$ also terminates the motor rotation when the valve is open fully. These limit switches are associated with both sets of terminals of valves $b$, $f$, $g$, $h$ and $j$. Switch N also energizes relay $n_1$ to close switch 201. This energizes solenoid $w$ so that valve W is opened. Relay $n_5$ is energized at the same time to close switch 173 to energize motor 56. Motor 56 drives the charts of recorders 55, 58 and 59 so that the water content of the oil in conduit 32 is recorded together with the specific gravity and temperature of the oil in tank 11. A further rise in the water level in tank 11 results in the oil in tank 11 above switch N being directed through valves A, C and W into outlet conduit 32.

When the water level rises in tank 11 to switch S, relay $s_1$ is energized to close switch 191. This energizes heating coil $H_M$ in switch M. Switch S also energizes relay $s_2$ to close switches 145 and 142 and open switch 140.

Closure of switch 142 results in motor $a$ being energized to rotate in the backward direction to close valve A. Relay $s_3$ is also energized at this time to open switch 154 and close switches 157 and 161. This energizes motor $c$ for rotation in the backward direction to close valve C. The last-mentioned circuit is completed between motor terminal $c_3$ and power terminal 121 through switches 157 and 158. This requires the relay $r_4$ not be energized at this time. This in turn means that the water level in tank 12 must be below switch R. The quantity of water placed in the two tanks is adjusted initially such that this condition is fulfilled. Closure of valves A and C results in all of the oil flowing from tank 11 passing through valve W. This slows down the flow of oil from tank 11.

The water level in tank 11 then continues to rise until it reaches switch M. This energizes relay $m_6$ to open switch 200, thereby deenergizing solenoid $w$ to close valve W instantly. The flow of oil into outlet conduit 32 is thereby terminated. Thus, a measured volume of oil representative of the volume of tank 11 between switches N and M is discharged from the metering apparatus into storage tank 34. Switch M energizes a counter 215 to record the termination of the transmission of oil out of tank 11. Counter 215 can comprise a solenoid operated ratchet wheel counter for example. Switch M also energizes relay $m_1$ to open switch 175 to deenergize pump motor 21'. Relays $m_3$ and $m_4$ are energized to close respective switches 165 and 167. This energizes motors $g$ and $h$ to open respective valves G and H. Relays $m_2$ and $m_5$ are energized by switch M to close respective switches 164 and 171. Motors $f$ and $j$ are thereby energized to close respective valves F and J. Relay $m_7$ is energized to close switch 210. This energizes solenoid $y$ through switches 210 and 212. Relay $r_2$, which actuates switch 212, is deenergized at this time because the water level in tank 12 is below switch R. Solenoid $y$ opens valve Y such that tanks 11 and 12 are in communication with one another through conduit 36.

This completes the first half of the metering cycle. The water level in tank 11 is at switch M while the water level in tank 12 is below switch V. Oil from conduit 10 is still directed into tank 12. The oil level in tank 12 then continues to rise and eventually moves switch L to the up position. This energizes relay $l_1$ to close switch 181. Closure of switch 181 results in motor $d$ being driven in the backward direction until the valve is "closed," that is, conduits 10 and 13 are in communication. At the end of this rotation limit switch 93 is opened to terminate rotation of motor $d$. Switch L also energizes relays $l_2$ to close switch 179 so that pump motor 21' is energized. At this time valves F and J are closed and valves G and H are open. Water is thus directed from tank 11 to tank 12 through conduit 18, valve H, conduit 22, pump 21, conduit 23, valve G and conduit 19. The rising water level in tank 12 actuated switch V which energizes relay $v_1$ to close switch 192. The heating coil $H_R$ of switch R is thereby energized.

The water level in tank 12 continues to rise to the level of switch R. This energizes relay $r_2$ through a switch 216 which is actuated by relay $p_7$. Switch 216 is closed in the absence of curent being supplied to relay $p_7$. At the time the water level reaches switch R in tank 12, the water level obviously is below switch P so that switch 216 is closed. Relay $r_2$ opens switches 206 and 212 so that solenoid $y$ is denergized. This closes valve Y. Switch R energizes relay $r_3$ which closes switch 148 to energize motor $b$ for rotation in the forward direction to open valve B. Relay $r_4$ is energized to open switch 158. This deenergizes relay $s_3$, the water level being below switch S in tank 11 at this time. Relay $n_4$ is energized so that motor $c$ is energized through switches 155 and 154 for rotation in the forward direction to open valve C. Relay $r_1$ is energized to close switch 203. This energizes solenoid $x$ which opens valve X. At this time, the oil displaced from tank 12 flows through valves B, C and X into outlet conduit 32. Switch R also energizes relay $r_5$ to close switch 174 which energizes motor 65. Motor 65 drives recorders 55, 63 and 64 to provide a measurement of the water content of the oil removed from tank 12 as well as a measurement of the specific gravity and temperature of the oil.

The water level in tank 12 continues to rise to actuate switch T which energizes relay $t_1$ to close switch 193. This energizes the heating coil $H_P$ of switch P. Switch T energizes relay $t_2$ to close switch 156. This energizes motor $c$ for rotation in the backward direction to close valve C. Relay $t_3$ is also energized to close switch 149. This energizes motor $b$ for rotation in the backward direction to close valve B.

When the water level in tank 12 reaches switch P, relay $p_6$ is energized to open switch 202. This deenergizes solenoid $x$ which closes valve X. The flow of oil from tank 12 into outlet conduit 32 is thereby terminated. Relay $p_1$ is energized to open switch 178 which deenergizes pump motor 21'. Relays $p_3$ and $p_4$ are energized to close respective switches 166 and 168. This energizes motors $g$ and $h$ for rotation in the backward direction to close respective valves G and H. Relays $p_2$ and $p_5$ are energized to close respective switches 163 and 170. This energizes motors $f$ and $j$ for rotation in the forward direction to open respective valves F and J. Relay $p_7$ is energized to open switch 216, thereby deenergizing relay $r_2$ to open switch 206. Solenoid $y$ is thereby energized through switches 206 and 205, the water level in tank 11 being below switch N so that switch 205 is closed. This opens valve Y. Switch P also energizes counter 215 to indicate that oil has been discharged from tank 12. The entire cycle of operation is then completed. The water level in tank 12 is at switch P and the water level in tank 11 is below switch U.

From the above description it should be apparent there is provided an improved meter for measuring oil or other fluids immiscible with a second fluid of greater density, such as water. The measurement is made from the rising water levels so a positive displaced volume of oil is measured. The results remain accurate even if small volumes of the water are lost through leakage.

While the invention has been described in conjunction with a present preferred embodiment, it should be apparent the invention is not limited thereto.

What is claimed is:

1. A liquid meter comprising first and second liquid containers, inlet conduit means including valve means to transmit liquid to be metered selectively into said first and second containers, first conduit means including valve means communicating between lower regions of said first and second containers, a pump in said first conduit means to pass a first liquid immiscible with and of greater density than the liquid to be metered, second conduit means including valve means communicating between upper regions of said first and second containers, an outlet conduit communicating with said second conduit means, first level responsive means to detect the first liquid at a first lower level in said first container, second level responsive means to detect the liquid to be measured at a second upper level in said first container, third level responsive means to detect the first liquid at a third upper level in said first container, fourth level responsive means to detect the first liquid at a fourth lower level in said second container, fifth level responsive means to detect the liquid to be measured at a fifth upper level in said second container, sixth level responsive means to detect the first liquid at a sixth upper level in said second container, means actuated by said plural level responsive means in each container to control said plural valve means and said pump delivery so that the liquid to be metered is passed into said first container until said second level is reached, at which time the liquid to be metered is passed into said second container and said pump passes the first liquid from said second container to said first container, the first liquid then rises in said first container until said first level is reached, at which the liquid to be metered is passed from said first container into said outlet conduit, the first liquid continues to rise in said first container until said third level is reached, at which time the liquid to be metered is no longer passed into said outlet conduit, said liquid to be metered continues to rise in said second container until said fifth level is reached, at which time the liquid to be metered is passed into said first container and said pump passes the first liquid from said first container to said second container, the first liquid then rises in said second container until said fourth level is reached, at which time the liquid to be metered is passed from said second container into said outlet conduit, the first liquid continues to rise in said second container until said sixth level is reached, at which time the liquid to be metered is no longer passed into said outlet conduit, and means to indicate the number of times the liquid to be metered rises in said containers.

2. The combination in accordance with claim 1 wherein said first, third, fourth and sixth level responsive means comprising electrical switches which are actuated when submerged in a conductive liquid, and said second and fifth level responsive means comprise electrical switches actuated by float members.

3. Apparatus constructed in accordance with claim 1 and adapted to meter oil, further comprising means to measure the specific gravity, temperature and water content of oil passed through said meter.

4. The combination in accordance with claim 3 wherein said means to measure the temperature of the oil comprises first and second temperature sensing means positioned within said first and second containers, respectively, said means to measure the specific gravity of the oil comprises first and second specific gravity sensing means positioned within said first and second containers, respectively, and said means to measure the water content of the oil is positioned within said outlet conduit.

5. A liquid meter comprising first and second liquid containers, inlet conduit means including valve means to transmit liquid to be metered selectively into said first and second containers, first conduit means including valve means communicating between lower regions of said first and second containers, a pump in said first conduit means to pass a first liquid immiscible with and of greater density than the liquid to be metered, second conduit means including valve means communicating between upper regions of said first and second containers, an outlet conduit means communicating with said second conduit means, first level response means to detect the first liquid at a first lower level in said first container, second level responsive means to detect the liquid to be measured at a second upper level in said first container, third level responsive means to detect the first liquid at a third upper level in said first container, fourth level responsive means to detect the first liquid at a fourth lower level in said second container, fifth level responsive means to detect the liquid to be measured at a fifth upper level in said second container, sixth level responsive means to detect the first liquid at a sixth upper level in said second container, means actuated by said second level responsive means to energize said pump and to open valve means to pass the first liquid from said second container to said first container and to pass the liquid to be measured to said second container, means actuated by said first level responsive means to open a valve in said second conduit means so that said first container and said outlet conduit are in communication, means actuated by said third level responsive means to stop said pump and to close the valve previously opened in said second conduit means, means actuated by said fourth level responsive means to energize said pump and to open valve means to pass the first liquid from said first container to said second container and to pass the liquid to be measured to said first container, means actuated by said fourth level responsive means to open a valve in said second conduit means so that said second container and said outlet conduit are in communication, means actuated by said sixth level responsive means to stop said pump and to close the second-mentioned valve previously opened in said second conduit means, and means to indicate the number of times the liquid to be metered rises in said containers.

6. The combination in accordance with claim 5 wherein said second conduit means comprises a first conduit communicating between upper regions of said first and second containers, first and second valves in said first conduit, a second conduit communicating between upper regions of said first and second containers, a storage chamber communicating with said second conduit, a first check valve in said second conduit between said first container and said storage chamber to permit flow toward said chamber, and a second check valve in said second conduit between said second container and said storage chamber to permit flow toward said chamber, said outlet conduit communicating with said first conduit between said first and second valves.

7. The combination in accordance with claim 6 further comprising a seventh level responsive means to indicate the liquid to be metered at a level in said first container below said second level, an eighth level responsive means to indicate the level of liquid to be metered at a level in said second container beneath said fifth level, a third conduit communicating between upper regions of said first and second containers, third and fourth valves in said third conduit, a fourth conduit communicating between said outlet conduit and said third conduit between said third and fourth valves, a fifth valve in said fourth conduit, said third an fifth valves being actuated by said seventh level responsive means, said fourth and fifth valves being actuated by said eight level responsive means, said first valve being actuated by said second level means, and said second valve being actuated by said fifth level responsive means.

8. The combination in accordance with claim 5 wherein said first conduit means comprises a first conduit communicating between lower regions of said first and second containers, first and second valves in said first conduit, a second conduit communicating between the inlet of said pump and said first conduit between said first and second valves, a third conduit having a second valve therein communicating between the outlet of said pump and the lower region of said first container, and a fourth conduit having a fourth valve therein communicating between the outlet of said pump and the lower region of said second container.

9. The combination in accordance with claim 5 wherein said first and fourth level responsive means each comprise a support secured to the inner wall of the respective container, an electrically conductive member depending from said support, a heating element in thermal engagement with said member, a first electrical lead connected to said member, means forming an electrode in engagement with the first liquid when the first liquid engages said member, and further comprising a first float switch in said first container at a level below said first level, a second float switch in said second container at a level below said fourth level, and means actuated by said first and second float switches to energize said heating elements of the level responsive means in the respective container therewith.

10. Apparatus to detect a rising interface in a container between a first electrically conductive liquid and a second non-conductive liquid immiscible with said first liquid and of lesser specific gravity comprising a support secured to the inner wall of the container, an electrically conductive member depending from said support, a heating element in thermal engagement with said member, a first electrical lead connected to said member, means forming an electrode in engagement with the first liquid when the first liquid engages said member, a float switch in the container below said member, and means actuated by said float switch to energize said heating element.

11. The method of metering oil which comprises filling a first container with a preselected volume of water, passing oil to be metered into a second container until the second container is substantially filled, removing water from the first container and passing same into the second container, thereby to expel oil from the second container, passing the oil expelled from the second container into the first container until the oil-water interface in the second container reaches a first level, thereafter collecting the oil expelled from the second container until the oil-water interface in the second container reaches a second higher level, passing additional oil to be metered into the first container after the second container is substantially filled and until the first container is substantially filled, removing water from the second container and passing same into the first container, thereby to expel oil from the first container, passing the oil expelled from the first container into the second container until the oil-water interface in the first container reaches a preselected level, and thereafter collecting the oil expelled from the first container until the oil-water interface reaches a second higher level in the first container.

12. The method of claim 11 which further comprises measuring the temperature and the specific gravity of the oil in the first and second containers, and measuring the water content of the collected oil which is expelled from the first and second containers.

13. The method of metering a first liquid which comprises filling a first container with a preselected volume of a second liquid which is immiscible with and of greater density than the first liquid to be metered, passing the first liquid into a second container until the second container is substantially filled, removing said second liquid from the first container and passing same into the second container, thereby to expel the first liquid from the second container, passing the first liquid expelled from the second container into the first container until the interface between the two liquids in the second container reaches a first level, thereafter collecting the first liquid expelled from the second container until the interface between the two liquids in the second container reaches a second higher level, passing additional first liquid to be metered into the first container after the second container is substantially filled and until the first container is substantially filled, removing said second liquid from the second container and passing same into the first container, thereby to expel the first liquid from the first container, passing the first liquid expelled from the first container into the second container until the interface between the two liquids in the first container reaches a preselected level, and thereafter collecting the first liquid expelled from the first container until the interface between the two liquids in the first container reaches a second higher level.

References Cited in the file of this patent

UNITED STATES PATENTS

| | | |
|---|---|---|
| 1,504,978 | Robbins | Aug. 12, 1924 |
| 2,325,695 | McAfee | Aug. 3, 1943 |
| 2,697,939 | Martin et al. | Dec. 28, 1954 |

FOREIGN PATENTS

| | | |
|---|---|---|
| 550,844 | France | Dec. 22, 1922 |
| 200,093 | Great Britain | June 27, 1923 |

UNITED STATES PATENT OFFICE

CERTIFICATE OF CORRECTION

Patent No. 2,920,483            January 12, 1960

Glen G. Hebard et al.

It is hereby certified that error appears in the printed specification of the above numbered patent requiring correction and that the said Letters Patent should read as corrected below.

Column 10, line 5, after "which" insert -- time --; line 53, for "response" read -- responsive --; column 11, line 40, for "means, and" read -- responsive means, and --; column 12, line 12, for "fiilled" read -- filled --.

Signed and sealed this 2nd day of August 1960.

(SEAL)
Attest:

KARL H. AXLINE                      ROBERT C. WATSON
Attesting Officer              Commissioner of Patents